United States Patent
Kim et al.

(10) Patent No.: US 11,455,708 B2
(45) Date of Patent: Sep. 27, 2022

(54) DISPLAY APPARATUS AND OPERATING METHOD THEREOF

(71) Applicant: LG ELECTRONICS INC., Seoul (KR)

(72) Inventors: Hyomin Kim, Seoul (KR); Yeonoh Nam, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/195,632

(22) Filed: Mar. 8, 2021

(65) Prior Publication Data

US 2022/0164930 A1    May 26, 2022

(30) Foreign Application Priority Data

Nov. 26, 2020   (KR) .......................... 1020200160658

(51) Int. Cl.
| | |
|---|---|
| *G09G 5/10* | (2006.01) |
| *G06T 5/00* | (2006.01) |
| *G06T 5/40* | (2006.01) |
| *H04N 1/60* | (2006.01) |

(Continued)

(52) U.S. Cl.
CPC ................ *G06T 5/009* (2013.01); *G06T 5/40* (2013.01); *G09G 5/10* (2013.01); *G06T 2207/10024* (2013.01); *G06T 2207/20208* (2013.01); *G09G 2320/066* (2013.01)

(58) Field of Classification Search
CPC combination set(s) only.
See application file for complete search history.

(56) References Cited

U.S. PATENT DOCUMENTS

| | | | |
|---|---|---|---|
| 8,339,475 B2 | 12/2012 | Atanassov et al. | |
| 8,416,179 B2* | 4/2013 | Kerofsky | ............. G09G 3/3611 |
| | | | 345/82 |
| 9,177,509 B2* | 11/2015 | Kerofsky | ............... H04N 5/147 |

(Continued)

FOREIGN PATENT DOCUMENTS

| | | |
|---|---|---|
| EP | 3493150 | 6/2019 |
| JP | 2010130150 | 6/2010 |

(Continued)

OTHER PUBLICATIONS

European Patent Office Application Serial No. 21159193.8, Search Report dated Aug. 18, 2021, 7 pages.

(Continued)

*Primary Examiner* — Wesner Sajous
(74) *Attorney, Agent, or Firm* — Lee, Hong, Degerman, Kang & Waimey PC

(57) ABSTRACT

A tone mapping apparatus includes a dynamic tone mapping module configured to generate a first tone mapping curve based on a luminance distribution histogram of input image data and generate first image data from the input image data using the first tone mapping curve, and a processor configured to generate an RGB distribution histogram, a detail region histogram and a high-luminance region histogram based on pixel information of the first image data, generate a second tone mapping curve using the RGB distribution histogram, the detail region histogram and the high-luminance region histogram and generate output image data from the first image data using the second tone mapping curve.

17 Claims, 14 Drawing Sheets

(51) Int. Cl.
H04N 9/67 (2006.01)
H04N 9/69 (2006.01)

(56) References Cited

U.S. PATENT DOCUMENTS

| 9,319,620 B2* | 4/2016 | Fujine | G09G 3/3426 |
| 9,350,961 B2* | 5/2016 | Fujine | G09G 3/3426 |
| 2012/0288197 A1 | 11/2012 | Adachi | |
| 2019/0068865 A1 | 2/2019 | Guerin et al. | |
| 2019/0164262 A1 | 5/2019 | Cellier et al. | |

FOREIGN PATENT DOCUMENTS

| JP | 6709986 B2 * | 6/2020 | G06T 11/00 |
| KR | 1020110105831 | 9/2011 | |
| KR | 1020160040981 | 4/2016 | |
| WO | 2010103668 | 9/2010 | |
| WO | WO-2013121601 A1 * | 8/2013 | G09G 3/3413 |
| WO | 2020081126 | 4/2020 | |

OTHER PUBLICATIONS

Korean Intellectual Property Office Application No. 10-2020-0160658, Office Action dated Sep. 13, 2021, 4 pages.

* cited by examiner

FIG. 7
| | INPUT IMAGE DATA | FIRST IMAGE DATA |
|---|---|---|
| FIRST IMAGE | 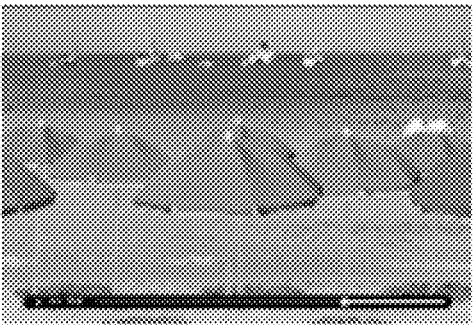 | 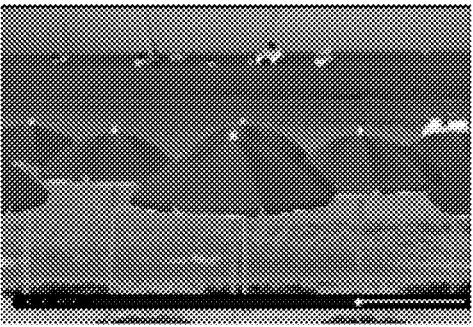 |
| SECOND IMAGE | 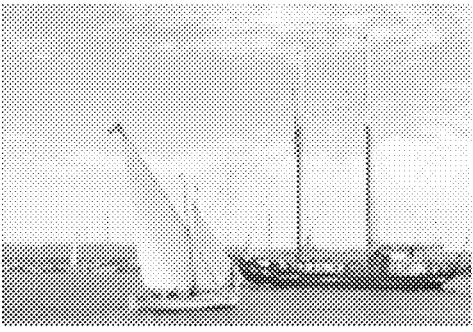 | 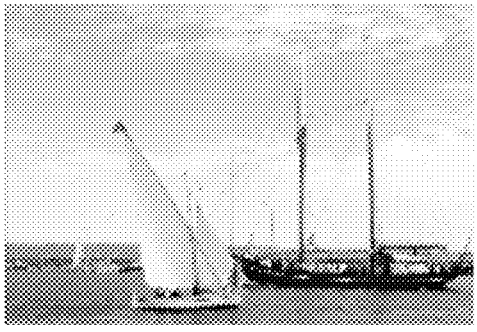 |

DISPLAY APPARATUS AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2020-0160658, filed on Nov. 26, 2020, the contents of which are all hereby incorporated by reference herein in its (their) entirety.

BACKGROUND

The present disclosure relates to display apparatus and operating method thereof. In detail, the present disclosure relates to a tone mapping in the display apparatus. Also, the present disclosure relates to a tone mapping apparatus and method in the display apparatus.

Digital images are generally composed of three channels of RGB. In general, standard dynamic range (SDR) images may express brightness in a range of 0 to 255 (8 bits) for each channel. However, since SDR images have a narrow range of brightness which may be expressed in each channel, dark portions may not be properly expressed or bright portions may not be properly expressed. For example, in the case of an image having a significant difference in brightness between a dark portion and a bright portion, such as a photograph taken in backlight, contrast balance may be skewed. Therefore, a large difference may occur between a scene viewed with naked eyes and an SDR image thereof. Images expressed in 16 bits or 32 bits for each channel may be called high dynamic range (HDR) images as compared to the SDR images, and the HDR images have wider brightness expression power and thus express images more realistically.

However, since a general display apparatus cannot express gradation of 16 bits or 32 bits, the HDR image of 16 bits or 32 bits needs to be converted into a digital image having a limited dynamic range. Tone mapping is used in a process of converting the HDR image into an SDR image or a low dynamic range (LDR) image, and may mean technology for compressing a brightness region of the HDR image into the brightness region of the SDR image or the LDR image while improving a contrast ratio.

SUMMARY

An object of the present disclosure devised to solve the problem lies in a tone mapping apparatus and method.

An object of the present disclosure is to provide a tone mapping function for minimizing an image darkness level while improving expression power in a bright region.

An object of the present disclosure to provide a tone mapping function for minimizing decrease in contrast ratio while improving brightness felt in a dark image.

An object of the present disclosure is to improve a contrast ratio through tone mapping even with respect to an SDR image.

A display apparatus according to an embodiment of the present disclosure comprises a controller configured to convert input image data into output image data; and a display configured to output an image according to the output image data converted by the controller, wherein the controller is configured to: generate a first tone mapping curve based on a luminance distribution histogram of input image data, generate first image data from the input image data using the first tone mapping curve, generate an RGB distribution histogram, a detail region histogram and a high-luminance region histogram based on pixel information of the first image data, generate a second tone mapping curve using the RGB distribution histogram, the detail region histogram and the high-luminance region histogram, and generate output image data from the first image data using the second tone mapping curve.

The controller is configured to: generate the luminance distribution histogram based on a luminance value of each pixel in an entire region of the input image data, and generate the first tone mapping curve for equalizing the luminance distribution histogram.

The controller is configured to: generate the RGB distribution histogram based on a luminance value of each pixel in an entire region of the first image data, generate the detail region histogram based on luminance values of pixels each having a detail degree equal to or greater than a predetermined detail reference value in the first image data, and generate the high-luminance region histogram based on luminance values of pixels equal to or greater than a predetermined luminance reference value in the first image data.

The detail degree is a change in luminance value for adjacent pixels within a certain distance.

The controller is configured to: convert each of the RGB distribution histogram, the detail region histogram and the high-luminance region histogram into a log scale, generate a weighted log-scale histogram by weighting the log-scale RGB distribution histogram, the log-scale detail region histogram and the log-scale high-luminance region histogram based on a predetermined weight, and generate a second tone mapping curve for equalizing the weighted log-scale histogram.

The controller is configured to modify the second tone mapping curve based on the predetermined boundary line.

The predetermined boundary is a straight line separated from a linear mapping straight line by a predetermined distance, and wherein the controller is configured to modify the second tone mapping curve not to be deviated from a correspondence relationship according to the predetermined boundary line.

The predetermined boundary includes a first boundary line located above the mapping straight line and a second boundary line located below the mapping straight line, and wherein the controller is configured to modify the second tone mapping curve not to be deviated from a region between the first boundary line and the second boundary line.

The controller is configured to generate the output image data from the first image data using at least one of a central processing unit (CPU) or a graphic processing unit (GPU).

A tone mapping method of a display apparatus according to an embodiment of the present disclosure comprises generating a first tone mapping curve based on a luminance distribution histogram of input image data; generating first image data from the input image data using the first tone mapping curve; generating an RGB distribution histogram, a detail region histogram and a high-luminance region histogram based on pixel information of the first image data; generating a second tone mapping curve using the RGB distribution histogram, the detail region histogram and the high-luminance region histogram; and generate output image data from the first image data using the second tone mapping curve.

A recording medium having recorded thereon a tone mapping method according to an embodiment of the present disclosure comprises generating a first tone mapping curve based on a luminance distribution histogram of input image data; generating first image data from the input image data using the first tone mapping curve; generating an RGB distribution histogram, a detail region histogram and a high-luminance region histogram based on pixel information of the first image data; generating a second tone mapping curve using the RGB distribution histogram, the detail region histogram and the high-luminance region histogram; and generate output image data from the first image data using the second tone mapping curve.

BRIEF DESCRIPTION OF THE DRAWINGS

FIGS. 6 to 8 are views showing comparison between input image data and first image data generated using the first tone mapping curve.

DETAILED DESCRIPTION OF THE EMBODIMENTS

Figure 1:
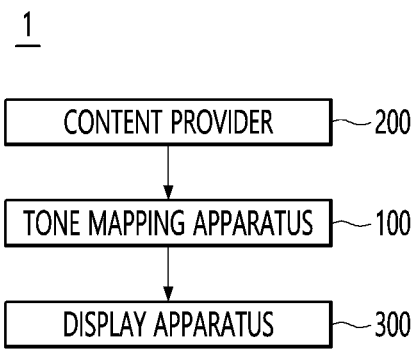
FIG. 1 is a block diagram showing a tone mapping system 1 according to an embodiment of the present disclosure.

Hereinafter, exemplary embodiments disclosed in the present specification will be described in detail with reference to the accompanying drawings, but identical or similar elements are denoted by the same reference numerals regardless of reference numerals, and redundant descriptions thereof will be omitted. The suffixes 'module' and 'unit' for constituent elements used in the following description are given or used interchangeably in consideration of only the ease of writing the specification, and do not have meanings or roles that are distinguished from each other. In addition, in describing the embodiments disclosed in the present specification, when it is determined that a detailed description of related known technologies may obscure the gist of the embodiments disclosed in the present specification, the detailed description thereof will be omitted. In addition, the accompanying drawings are for easy understanding of the embodiments disclosed in the present specification, and the technical idea disclosed in the present specification is not limited by the accompanying drawings, and all changes included in the spirit and scope of the present disclosure It should be understood to include equivalents or substitutes.

Terms including an ordinal number such as first and second may be used to describe various elements, but the elements are not limited by the terms. These terms are used only for the purpose of distinguishing one component from another component.

When an element is referred to as being 'connected' to another element, it is understood that it may be directly connected to the other element or it should be understood that other elements may exist in the middle. On the other hand, when it is mentioned that a certain element is 'directly connected' to another element, it should be understood that no other element exists in the middle.

In the present disclosure, brightness and luminance may be used in the same concept.

FIG. 1 is a block diagram showing a tone mapping system 1 according to an embodiment of the present disclosure.

Referring to FIG. 1, the tone mapping system 1 may include a content provider 200, a tone mapping apparatus 100 and a display apparatus 300. The content provider 200 may provide image data corresponding to content to be output to the tone mapping apparatus 100, the tone mapping apparatus 100 may generate output image data through tone mapping from HDR image data corresponding to the received image data, and the display apparatus 300 may display the output image data through a display panel. Further, the content provider 200 may provide audio data corresponding to content to be output to the tone mapping apparatus 100 or the display apparatus 300, and the display apparatus 300 may output the audio data through a speaker.

The content provider 200 means an apparatus for providing content to be output from the display apparatus 300, and may be implemented as a database, a server, etc. The content provider may provide a standard dynamic range (SDR) image or a high dynamic range (HDR) image corresponding to content to be provided. Hereinafter, the SDR image may be used in the sense of an image contrasted with the HDR image and may include a low dynamic range (LDR) image. In addition, hereinafter, the term SDR image may be used interchangeably with the term SDR image data and the term HDR image may be used interchangeably with the term HDR image data.

The content provider 200 may generate an SDR image or an HDR image using converted digital data and encode the SDR image or the HDR image, after scanning RAW data or an analog film of content using a scanner. The encoded image may be transmitted to the tone mapping apparatus 100 via a broadcast network or an IP network or may be stored in a storage medium such as a DVD or a Blu-ray (BD) disc.

The content provider 200 may transmit image data generated by itself or image data stored in a memory (not shown) to the tone mapping apparatus 100.

The tone mapping apparatus 100 may decode image data received from the content provider 200, perform tone mapping with respect to the decoded image data if necessary, and transmit output image data to the display apparatus 300, thereby displaying content. The tone mapping apparatus may generate output image data through tone mapping, if image data is HDR image data. The output image data may be SDR image data. Hereinafter, input image data may refer to as HDR image data which has already been decoded or HDR image data before being decoded.

In one embodiment, if the received image data is SDR image data, the tone mapping apparatus 100 may generate HDR image data using a plurality of decoded SDR image data, analyze the generated HDR image data to generate a tone mapping curve, and generate output image data from the HDR image data using the generated tone mapping curve. Technology for generating HDR image data from a plurality of SDR image data is referred to as an HDR imaging technology, and may include, for example, synthesizing a plurality of SDR images having different degrees of exposure through bracketing and generating one HDR image.

In one embodiment, if the received image data is HDR image data, the tone mapping apparatus 100 may analyze decoded HDR image data to generate a tone mapping curve and generate output image data from the HDR image data using the generated tone mapping curve.

The display apparatus 300 may mean an apparatus for displaying output image data generated and transmitted by the tone mapping apparatus 100 through a display panel (not shown). The display panel (not shown) of the display apparatus 300 may be an SDR panel or an HDR panel according to the embodiment.

In one embodiment, the tone mapping apparatus 100 may include a display panel and directly display the output image data. This may mean that the tone mapping apparatus 100 and the display apparatus 300 are implemented as one apparatus. For example, the tone mapping apparatus 100 may be an intelligent display apparatus in which a computer support function is added to a broadcast reception function.

In one embodiment, the tone mapping apparatus 100 may include a camera or an image sensor and directly generate input image data. This may mean that the tone mapping apparatus 100 and the content provider 200 are implemented as one apparatus. For example, the tone mapping apparatus 100 may be a smartphone, a tablet, a mobile robot, etc. including a camera.

Figure 2:
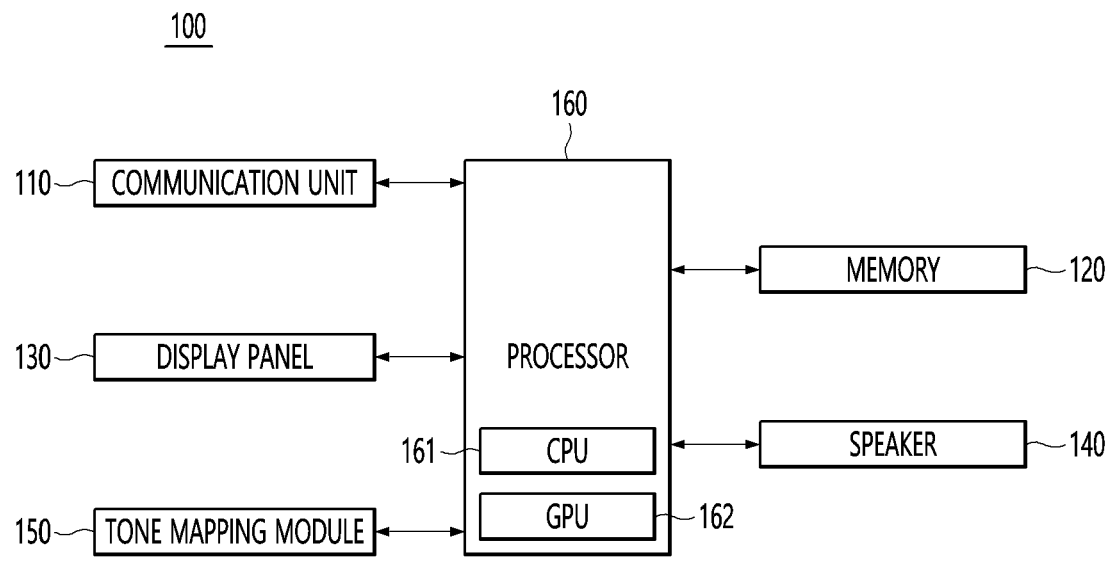
FIG. 2 is a block diagram showing a tone mapping apparatus 100 according to an embodiment of the present disclosure.

FIG. 2 is a block diagram showing a tone mapping apparatus 100 according to an embodiment of the present disclosure.

Referring to FIG. 2, the tone mapping apparatus 100 may be connected to at least one of the content provider 200 or the display apparatus 300 to transmit and receive at least one of image data or audio data corresponding to the content to be output.

The tone mapping apparatus 100 may be a display apparatus including the display panel 130 and capable of outputting an image, which may mean that the tone mapping apparatus 100 and the display apparatus 300 are implemented as one apparatus. For example, the tone mapping apparatus 100 includes fixed devices or movable devices such as TVs, projectors, mobile phones, smartphones, desktop computers, laptops, digital broadcasting terminals, personal digital assistants (PDAs), portable multimedia players (PMPs), navigation systems, tablet PCs, wearable devices, and set-top boxes (STB), DMB receivers, radios, speakers, washing machines, refrigerators, digital signages, robots, vehicles and the like.

The tone mapping apparatus 100 may include a communication unit 110, a memory 120, a tone mapping module 150 and a processor 160. Further, a display panel 130 and a speaker 140 may be further included.

The communication unit 110 may perform communication with an external device through wired or wireless communication. For example, the communication unit 110 may receive at least one of image data or audio data from the content provider 200 and transmit output image data or audio data to the display apparatus 300.

Communication technology used by the communication unit 110 may include GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication) and the like.

The communication unit 110 may be referred to as a communication modem or a communication interface.

The memory 120 may temporarily or permanently store programs, image data, audio data, etc. for processing and controlling each signal in the processor 160. For example, the memory 120 may temporarily or permanently store content data and temporarily store output image data or analysis data (e.g., a histogram, etc.) generated in a process of generating a tone mapping curve for input image data.

The tone mapping apparatus 100 may reproduce the content data (moving image data, still mage data, music data, document data, application data, etc.) stored in the memory 120 and provide the content data to a user. This may mean that the tone mapping apparatus 100 and the content provider 200 are implemented as one apparatus.

The display panel 130 may convert an image signal, a data signal or an OSD signal processed in the processor 160 or an image signal, a data signal, etc. received from the communication unit 110 into an RGB signal and output an image based on the converted RGB signal.

The speaker 140 may convert an audio signal processed in the processor 160 or an audio signal received from the communication unit 110 into sound waves and output audio.

The tone mapping module 150 may mean a module for performing dynamic tone mapping by analyzing a luminance distribution of an entire image with respect to input image data and may be an application specific integrated circuit (ASIC). The tone mapping module 150 may be referred to as a tone mapping block.

In dynamic tone mapping performed in the tone mapping module 150, a first tone mapping curve may be generated using a luminance distribution histogram of an entire image, and first image data may be generated from input image data using the first tone mapping curve. The tone mapping module 150 only performs tone mapping in consideration of only the entire luminance distribution of the input image data and thus the tone mapping module 150 may be considered to perform primary tone mapping. Therefore, the first image data may be referred to as primary tone-mapped image data. Primary tone mapping is performed in the tone mapping module 150 which is hardware having tone mapping operation which has already been determined and thus may be referred to as hardware based tone mapping.

The processor 160 may control overall operation of the tone mapping apparatus 100.

The processor 160 may decode the image data received from the content provider 200 or the image data stored in the memory 120. As described above, the decoded HDR image data may be referred to as input image data, and the input image data may be converted into first image data in the tone mapping module 150. In one embodiment, the tone mapping apparatus 100 may include a separate decoder (not shown) and the decoder (not shown) may decode the image data received from the content provider 200 or the image data stored in the memory 120.

The processor 160 may generate a second tone mapping curve for the first image data based on pixel information of the first image data subjected to the primary tone mapping operation and generate output image data from the first image data using the second tone mapping curve. The processor 160 may further perform tone mapping with respect to the first image data subjected to primary tone mapping in the tone mapping module 150, and thus the processor 160 may be considered to perform secondary tone mapping. Therefore, the output image data may be referred to as secondary tone-mapped image data.

Secondary tone mapping is performed through at least one of a central processing unit (CPU) or a graphic processing unit (GPU) for performing various operations and thus may be preferred to as software based tone mapping.

The image signal (e.g., the output image data) image-processed in the processor 160 may be input to the display 130, thereby displaying an image corresponding to the image signal. In addition, the image signal image-processed in the processor 160 may be transmitted to the display apparatus 300 through the communication unit 110.

The audio signal (e.g., audio data) processed in the processor 160 may be audibly output through the speaker 140. In addition, the audio signal processed in the processor 160 may be transmitted to the display apparatus 300 through the communication unit 110.

Meanwhile, the tone mapping apparatus 100 shown in FIG. 2 is merely an embodiment of the present disclosure, and some of the shown components may be integrated, added or omitted according to the specifications of the tone mapping apparatus 100 which is actually implemented.

In one embodiment, two or more components of the tone mapping apparatus 100 may be combined to one component or one component may be subdivided into two or more components. In addition, the function performed in each block is to explain the embodiment of the present disclosure and detailed operations or apparatuses thereof do not limit the scope of the present disclosure.

Meanwhile, according to an embodiment of the present disclosure, the tone mapping apparatus 100 may be a portion of the display apparatus. That is, the tone mapping apparatus 100 and the display apparatus may be implemented as one apparatus. In this case, the display apparatus may perform operation of the tone mapping apparatus described in FIG. 2.

Figure 3:
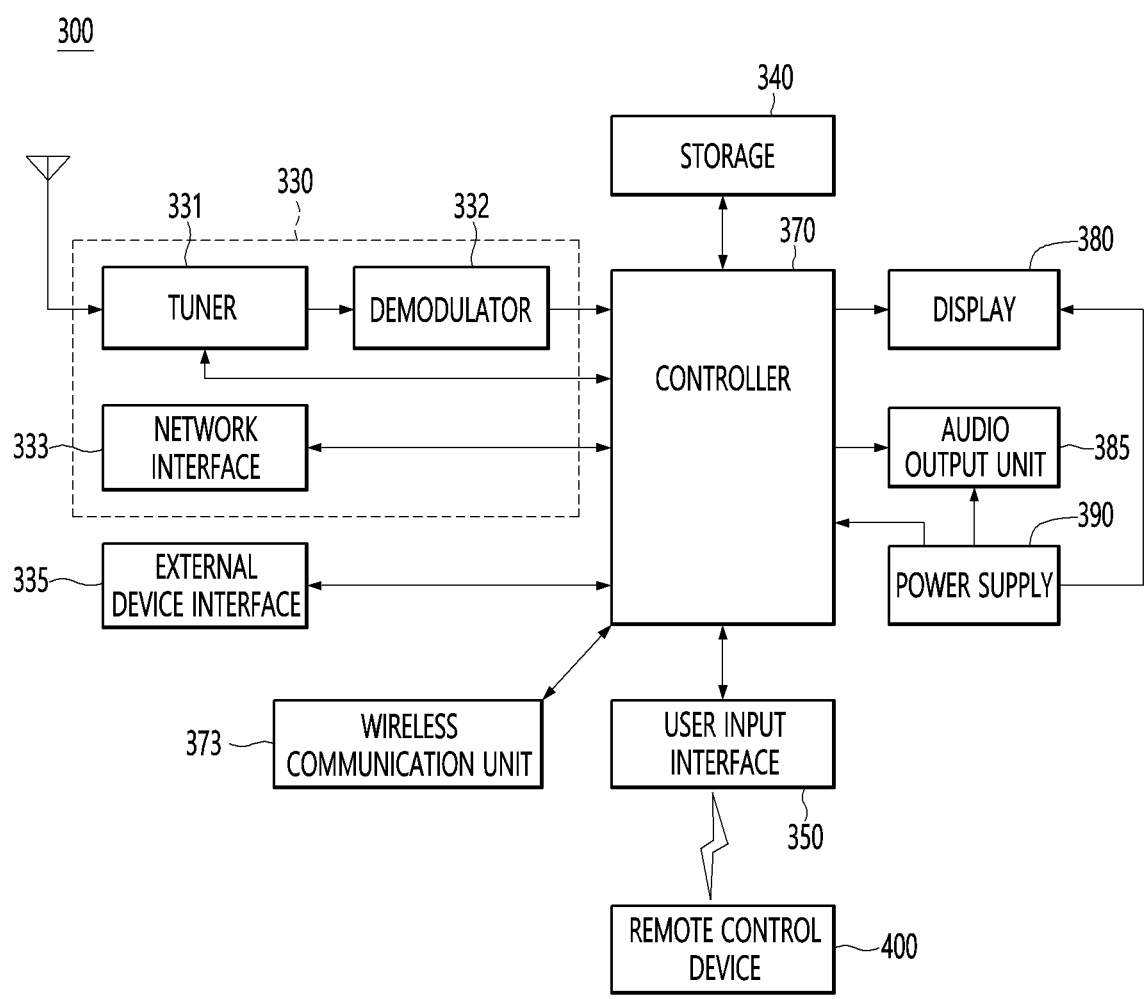
FIG. 3 is a block diagram showing a display apparatus according to an embodiment of the present disclosure.

Specifically, the display apparatus 300 shown in FIG. 3 may include the tone mapping apparatus 100 shown in FIG. 2. That is, the display apparatus 300 may include the components shown in FIG. 2. For example, the display panel 130 may be included in a display 380, and the tone mapping module 150 and the processor 160 may be included in a controller 370. However, this is only an example, the tone mapping module 150 or the processor 170 may form one component of the display apparatus 300 independently of the components shown in FIG. 3.

The display apparatus 300 shown in FIG. 3 may operate according to the tone mapping method according to the present disclosure.

FIG. 3 is a block diagram showing a display apparatus according to an embodiment of the present disclosure.

Referring to FIG. 3, the display apparatus 300 may include a broadcast receiver 330, an external device interface 335, a storage 340, a user input interface 350, a controller 370, and a wireless communication unit 373, a display 380, an audio output unit 385, and a power supply 390.

the broadcast receiver 330 may a tuner 331, a demodulator 332 and a network interface 333.

The tuner 331 may select a specific broadcast channel according to a channel selection command. The tuner 331 may receive a broadcast signal for the selected specific broadcast channel.

The demodulator 332 may separate the received broadcast signal into a video signal, an audio signal, and a data signal related to a broadcast program, and restore the separated video signal, audio signal, and data signal to a format capable of being output.

The network interface 333 may provide an interface for connecting the display apparatus 300 to a wired/wireless network including an Internet network. The network interface 333 may transmit or receive data to or from other users or other electronic devices through a connected network or another network linked to the connected network.

The network interface 333 may access a predetermined web page through the connected network or the other network linked to the connected network. That is, it is possible to access a predetermined web page through a network, and transmit or receive data to or from a corresponding server.

In addition, the network interface 333 may receive content or data provided by a content provider or a network operator. That is, the network interface 333 may receive content such as a movie, advertisement, game, VOD, broadcast signal, and related information provided by a content provider or a network provider through a network.

In addition, the network interface 333 may receive update information and update files of firmware provided by the network operator, and may transmit data to an Internet or content provider or a network operator.

The network interface 333 may select and receive a desired application from among applications that are open to the public through a network.

The external device interface 335 may receive an application or a list of applications in an external device adjacent thereto, and transmit the same to the controller 370 or the storage 340.

The external device interface 335 may provide a connection path between the display apparatus 300 and the external device. The external device interface 335 may receive one or more of video and audio output from an external device connected to the display apparatus 300 wirelessly or by wire and transmit the same to the controller 370. The external device interface 335 may include a plurality of external input terminals. The plurality of external input terminals may include an RGB terminal, one or more High Definition Multimedia Interface (HDMI) terminals, and a component terminal.

The video signal of the external device input through the external device interface 335 may be output through the display 380. The audio signal of the external device input through the external device interface 335 may be output through the audio output unit 385.

The external device connectable to the external device interface 335 may be any one of a set-top box, a Blu-ray player, a DVD player, a game machine, a sound bar, a smartphone, a PC, a USB memory, and a home theater, but this is only an example.

In addition, a part of content data stored in the display apparatus 300 may be transmitted to a selected user among a selected user or a selected electronic device among other users or other electronic devices registered in advance in the display apparatus 300.

The storage 340 may store programs for signal processing and control of the controller 370, and may store video, audio, or data signals, which have been subjected to signal processing.

In addition, the storage 340 may perform a function for temporarily storing video, audio, or data signals input from an external device interface 335 or the network interface 333, and store information on a predetermined video through a channel storage function.

The storage 340 may store an application or a list of applications input from the external device interface 335 or the network interface 333.

The display apparatus 300 may play back a content file (a moving image file, a still image file, a music file, a document file, an application file, or the like) stored in the storage 340 and provide the same to the user.

The user input interface 350 may transmit a signal input by the user to the controller 370 or a signal from the controller 370 to the user. For example, the user input interface 350 may receive and process a control signal such as power on/off, channel selection, screen settings, and the like from the remote control device 400 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 370 to the remote control device 400.

In addition, the user input interface 350 may transmit a control signal input from a local key (not shown) such as a power key, a channel key, a volume key, and a setting value to the controller 370.

The video signal image-processed by the controller 370 may be input to the display 380 and displayed with video corresponding to a corresponding video signal. Also, the video signal image-processed by the controller 370 may be input to an external output device through the external device interface 335.

The audio signal processed by the controller 370 may be output to the audio output unit 385. Also, the audio signal processed by the controller 370 may be input to the external output device through the external device interface 335.

In addition, the controller 370 may control the overall operation of the display apparatus 300.

In addition, the controller 370 may control the display apparatus 300 by a user command input through the user input interface 350 or an internal program and connect to a network to download an application a list of applications or applications desired by the user to the display apparatus 300.

The controller 370 may allow the channel information or the like selected by the user to be output through the display 380 or the audio output unit 385 along with the processed video or audio signal.

In addition, the controller 370 may output a video signal or an audio signal through the display 380 or the audio output unit 385, according to a command for playing back a video of an external device through the user input interface 350, the video signal or the audio signal being input from an external device, for example, a camera or a camcorder, through the external device interface 335.

Meanwhile, the controller 370 may control the display 380 to display a video and, for example, perform control to display, on the display 380, a broadcast video which is input through the tuner 131 or an external input video which is input through the external device interface 335, a video which is input through the network interface unit or a video which is stored in the storage 340. In this case, the video displayed on the display 380 may be a still image or a moving image, and may be a 2D image or a 3D image.

In addition, the controller 370 may perform control to play back content stored in the display apparatus 300, received broadcast content, or external input content input from the outside, and the content may have various forms such as a broadcast video, an external input video, an audio file, still images, accessed web screens, and document files.

The wireless communication unit 373 may communicate with an external device through wired or wireless communication. The wireless communication unit 373 may perform short range communication with an external device. To this end, the wireless communication unit 373 may support short range communication using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication unit 373 may support wireless communication between the display apparatus 300 and a wireless communication system, between the display apparatus 300 and another display apparatus 300, or between the display apparatus 300 and a network in which the display apparatus 300 (or an external server) is located, through wireless area networks. The wireless area networks may be wireless personal area networks.

Here, the another display apparatus 300 may be a wearable device (e.g., a smartwatch, smart glasses or a head mounted display (HMD), a mobile terminal such as a smart phone, which is able to exchange data (or interwork) with the display apparatus 300 according to the present disclosure. The wireless communication unit 373 may detect (or recognize) a wearable device capable of communication around the display apparatus 300. Furthermore, when the detected wearable device is an authenticated device to communicate with the display apparatus 300 according to the present disclosure, the controller 370 may transmit at least a portion of data processed by the display apparatus 300 to the wearable device through the wireless communication unit 373. Therefore, a user of the wearable device may use data processed by the display apparatus 300 through the wearable device.

The display 380 may convert a video signals, data signal, or OSD signal processed by the controller 370, or a video signal or data signal received from the external device interface 335 into R, G, and B signals, and generate drive signals.

Meanwhile, the display apparatus 300 illustrated in FIG. 3 is only an embodiment of the present disclosure, and therefore, some of the illustrated components may be integrated, added, or omitted depending on the specification of the display apparatus 300 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display apparatus 300 shown in FIG. 3, the display apparatus 300 may receive a video through the network interface 333 or the external device interface 335 without a tuner 131 and a demodulator 132 and play back the same.

For example, the display apparatus 300 may be divided into an image processing device, such as a set-top box, for receiving broadcast signals or content according to various network services, and a content playback device that plays back content input from the image processing device.

In this case, an operation method of the apparatus according to an embodiment of the present disclosure will be described below may be implemented by not only the display apparatus 300 as described with reference to FIG. 3 and but also one of an image processing device such as the separated set-top box and a content playback device including the display 380 the audio output unit 385.

The audio output unit 385 may receive a signal audio-processed by the controller 370 and audibly output the same.

The power supply 390 may supply corresponding power to the display apparatus 300. Particularly, power may be supplied to the controller 370 that may be implemented in the form of a system on chip (SOC), the display 380 for video display, and the audio output unit 385 for audio output.

Specifically, the power supply 390 may include a converter that converts AC power into DC power, and a dc/dc converter that converts a level of DC power.

The remote control device 400 may transmit a user input to the user input interface 350. To this end, the remote control device 400 may use Bluetooth, Radio Frequency (RF) communication, Infrared (IR) communication, Ultra Wideband (UWB), ZigBee, or the like. In addition, the remote control device 400 may receive a video, audio, or data signal or the like output from the user input interface 350, and display or audibly output the same through the remote control device 400.

Figure 4:
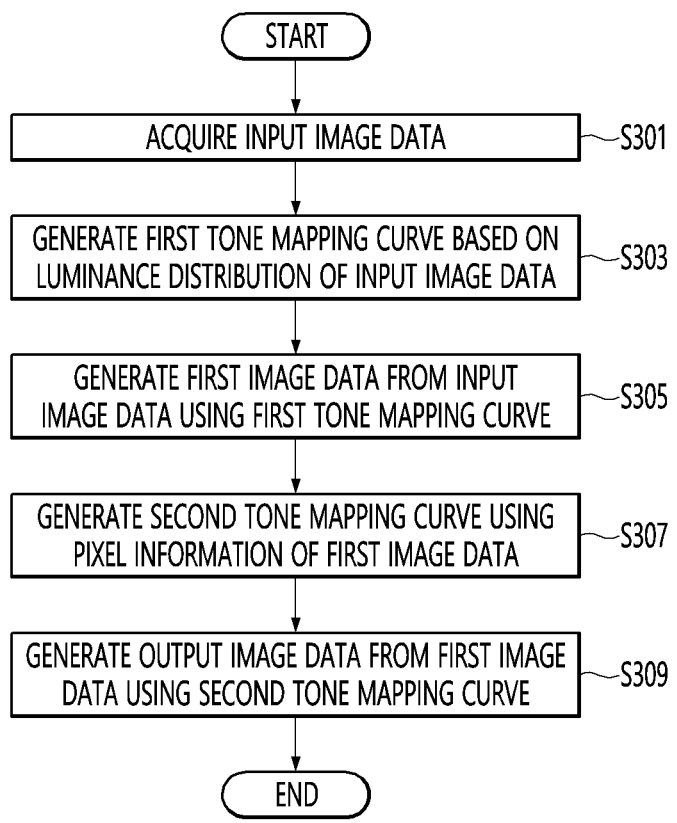
FIG. 4 is a flowchart illustrating a tone mapping method according to an embodiment of the present disclosure.

FIG. 4 is a flowchart illustrating a tone mapping method according to an embodiment of the present disclosure.

Referring to FIG. 4, the processor 160 of the tone mapping apparatus 100 acquires input image data (S301).

The input image data may mean HDR image data corresponding to content data, and may be data which has already been decoded. When the image data included in the content data is SDR image data, the input image data may be HDR image data generated from the decoded SDR image data. Alternatively, when the image data included in the content data is HDR image data, the input image data may be decoded HDR image data. Hereinafter, the image data included in the content data may be referred to as content image data.

The processor 160 may receive content data from the content provider 200 through the communication unit 110 or receive content data stored in the memory 120, decode the received content data, and convert SDR image data into HDR image data if necessary, thereby acquiring input image data.

In addition, the tone mapping module 150 of the tone mapping apparatus 100 generates a first tone mapping curve based on the luminance distribution of the input image data (S303).

The processor 160 may generate a luminance distribution histogram based on the luminance distribution of the entire region of the input image data and generate a first tone mapping curve based on the luminance distribution histogram. For example, the first tone mapping curve may be a tone mapping curve for equalizing the luminance distribution histogram.

In addition, the tone mapping module 150 of the tone mapping apparatus 100 generates first image data from the input image data using the first tone mapping curve (S305).

Since the first image data is an image in which the luminance distribution is equalized from the input image data, the luminance distribution of the entire region may be uniform. However, if the luminance distribution is excessively skewed in original image data, the first image data generated based on histogram equalization may have a greater difference from actual luminance than the original image data. Therefore, it is necessary to minimize distortion by performing second tone mapping with respect to the first image data using a method described later.

In addition, the processor 160 of the tone mapping apparatus 100 generates a second tone mapping curve using pixel information of the first image data (S307).

Since the first tone mapping curve generated in the tone mapping module 150 is generated in consideration of the luminance distribution of the entire region of the input image data, there is a problem that the image characteristics of a local region cannot be reflected. Therefore, the processor 160 may generate a second tone mapping curve considering the image characteristics of the local region in consideration of the pixel information of the first image data. The pixel information of the first image data may include at least one of RGB information or Y (luminance) information in each pixel of the first image data.

In addition, the processor 160 of the tone mapping apparatus 100 generates output image data from the first image data using the second tone mapping curve (S309).

Since the output image data is image data subjected to tone mapping (second tone mapping) in consideration of all the distribution of the entire region of the image data, the luminance distribution of a detail region and the luminance distribution of a high-luminance region, the expression power in the high-luminance region and the detail region is improved and a contrast ratio is improved while brightness is uniformly distributed in the entire region.

The generated output image data may be output through the display panel 130 of the tone mapping apparatus 100 or the display panel (not shown) of the display apparatus 300.

The order of steps shown in FIG. 4 is merely an example and the present disclosure is not limited thereto. That is, in one embodiment, the order of some of the steps shown in FIG. 4 may be changed. In addition, in one embodiment, some of the steps shown in FIG. 4 may be performed in parallel. In addition, only some of the steps shown in FIG. 4 may be performed.

FIG. 4 shows only a cycle of the tone mapping method, and the tone mapping method shown in FIG. 4 may be repeatedly performed. That is, after step S309 of generating the output image data is performed, step S301 of acquiring the input image data may be performed again.

Figure 5:
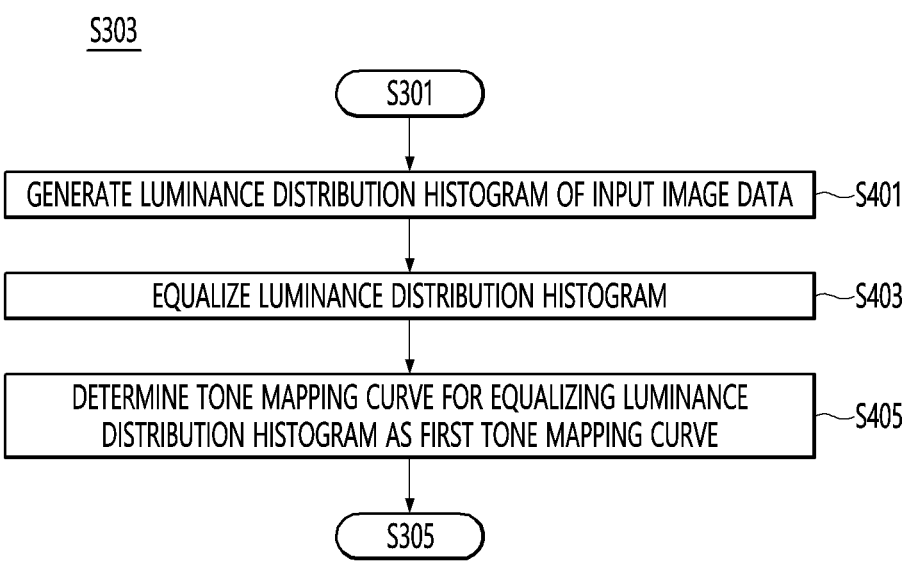
FIG. 5 is a flowchart illustrating an example of step S303 of generating the first tone mapping curve shown in FIG. 4.

FIG. 5 is a flowchart illustrating an example of step S303 of generating the first tone mapping curve shown in FIG. 4.

Referring to FIG. 5, the tone mapping module 150 of the tone mapping apparatus 100 generates the luminance distribution histogram of the entire region of the input image data (S401).

The luminance distribution histogram may mean the distribution histogram of the largest value of R, G and B of each pixel in the entire region of image data, or the distribution histogram of a luminance value calculated from R, G and B of each pixel.

In addition, the tone mapping module 150 of the tone mapping apparatus 100 equalizes the luminance distribution histogram (S403).

The tone mapping module 150 may equalize the luminance distribution histogram using a histogram equalization algorithm, and the histogram equalization algorithm may mean an algorithm for mapping luminance such that the luminance distribution becomes uniform in all sections. In the equalized histogram, a cumulative histogram appears linearly.

In addition, the tone mapping module 150 of the tone mapping apparatus 100 determines a tone mapping curve for equalizing the luminance distribution histogram as a first tone mapping curve (S405).

That is, the first tone mapping process may mean luminance distribution equalization in the entire region.

The order of steps shown in FIG. 5 is merely an example and the present disclosure is not limited thereto. In addition, in one embodiment, some of the steps shown in FIG. 5 may be performed in parallel. In addition, only some of the steps shown in FIG. 5 may be performed.

Figure 6:
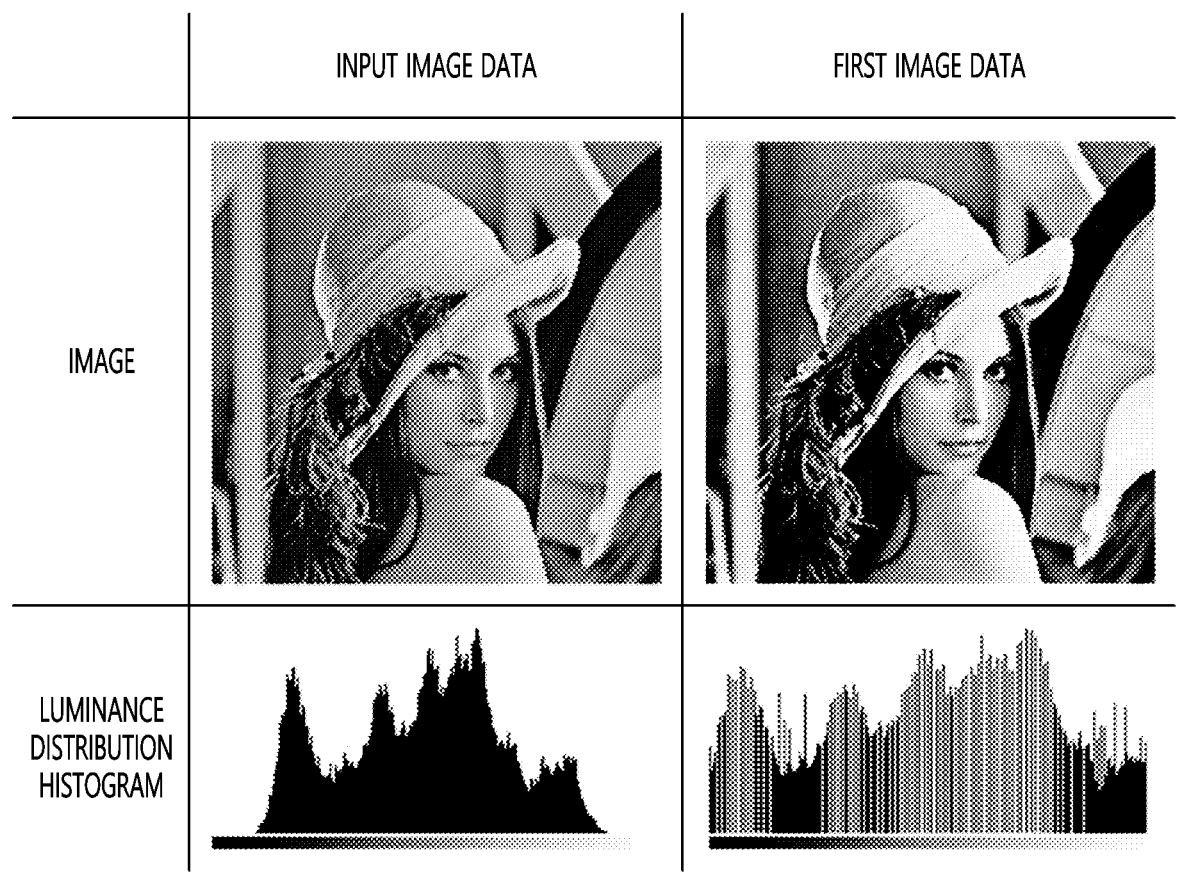
Figure 8:
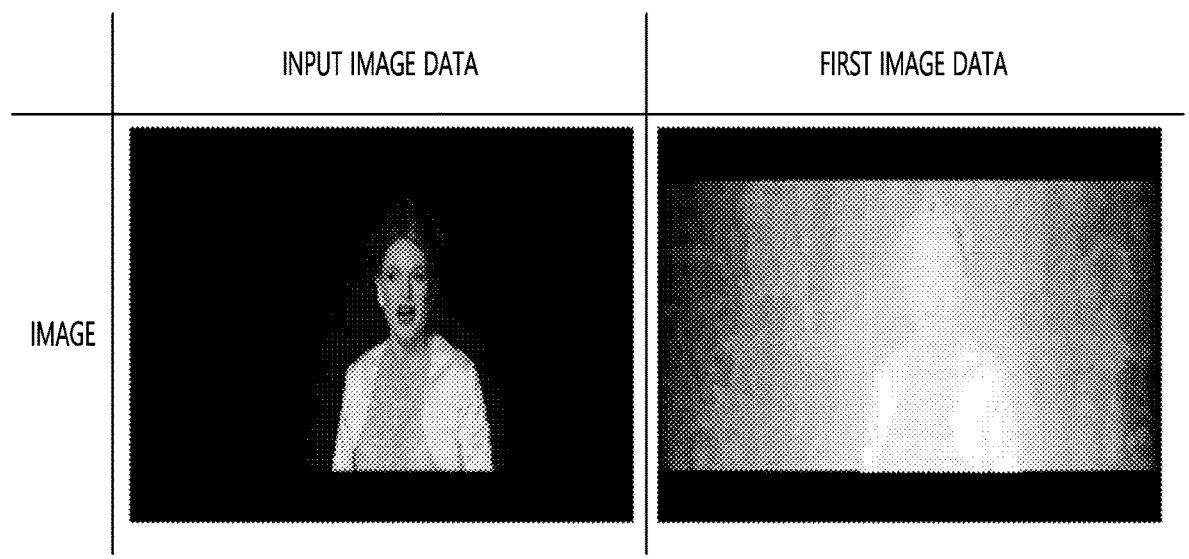

FIGS. 6 to 8 are views showing comparison between input image data and first image data generated using the first tone mapping curve.

Referring to FIGS. 6 and 7, the first image data generated using the first tone mapping curve for performing histogram equalization has a uniform luminance distribution as compared to the input image data. Therefore, it can be seen that the expression power in the entire region of the image is greatly improved.

On the contrary, referring to FIG. 8, since the luminance distribution of the input image data is largely skewed, it can be seen that the expression power of the first image data generated from the input image data according to histogram equalization is greatly decreased. This is a problem caused because the characteristics of a partial detail region or a high-luminance region in the image is not well reflected.

Figure 9:
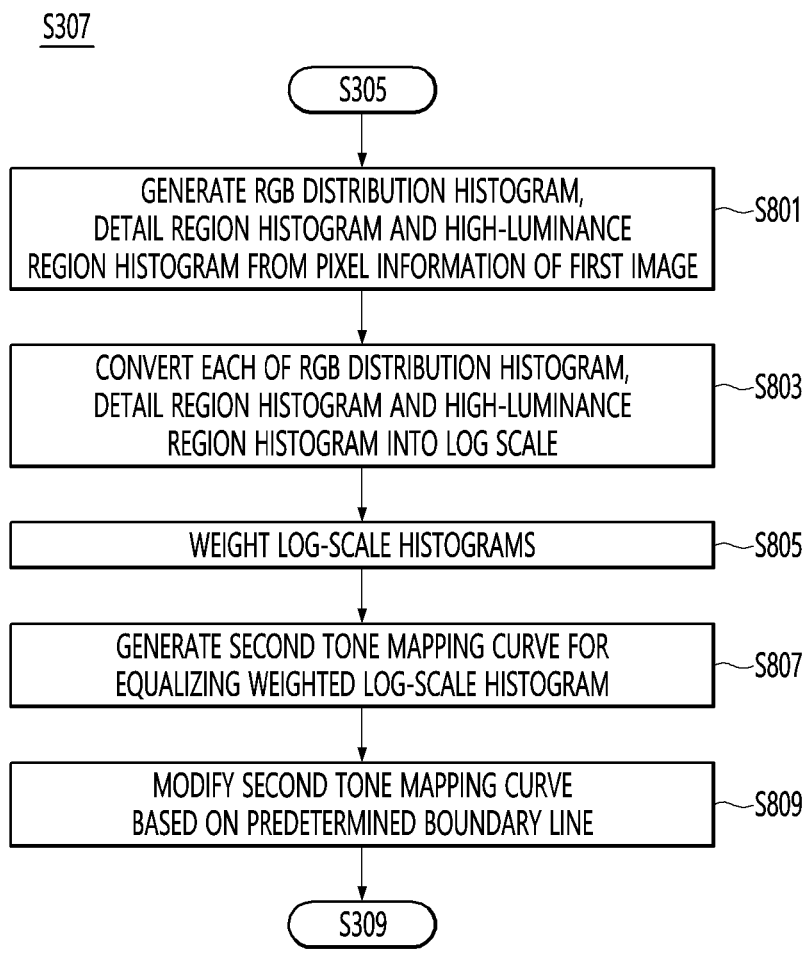
FIG. 9 is a flowchart illustrating an example of step S307 of generating the second tone mapping curve shown in FIG. 4.

FIG. 9 is a flowchart illustrating an example of step S307 of generating the second tone mapping curve shown in FIG. 4.

Referring to FIG. 9, the processor 160 of the tone mapping apparatus 100 generates an RGB distribution histogram, a detail region histogram and a high-luminance region histogram from the pixel region of the first image data (S801).

The processor 160 may generate a second tone mapping curve using the RGB distribution histogram, the detail region histogram and the high-luminance region histogram of the first image data, and generate the output image data from the first image data using the second tone mapping curve.

The RGB distribution histogram may individually an R distribution histogram, a G distribution histogram and a B distribution histogram of each pixel or the distribution histogram of a luminance value calculated from R, G or B. The latter case may have the same concept as the luminance distribution histogram in the first tone mapping process.

The detail region histogram is a luminance distribution histogram of pixels in which the detail degree of each pixel in the image data is equal to or greater than a predetermined detail reference value, and the detail degree of each pixel may mean a step difference (or change rate) with adjacent pixels in each pixel. That is, a pixel having a large change in color or luminance compared to neighboring pixels may mean a pixel having a large detail degree.

The high-luminance region histogram may mean the luminance distribution histogram of pixels having a gradation value equal to or greater than a predetermined high-luminance reference value.

In addition, the processor 160 of the tone mapping apparatus 100 converts each of the RGB distribution histogram, the detail region histogram and the high-luminance histogram into a log scale (S803).

The processor 160 converts each histogram into a log scale, thereby reducing a deviation between data, reducing skewness and kurtosis, increasing normality, and preventing the histogram from being excessively equalized even if the data is skewed.

In addition, the processor 160 of the tone mapping apparatus 100 weights the histograms of the log scale (S805).

The processor 160 may weight log-scale histograms using a predetermined gain or weight for each log-scale histogram. Such a gain or weight may mean a weight or a degree of importance among the expression power in the entire region, the expression power in the detail region and the expression power in the high-luminance region.

In addition, the processor 160 of the tone mapping apparatus 100 generates a second tone mapping curve for equalizing the weighted log-scale histogram (S807).

In addition, the processor 160 of the tone mapping apparatus 100 modifies the second tone mapping curve based on a predetermined boundary line (S809).

If data is skewed and distributed in the weighted log-scale histogram, the second tone mapping curve for equalizing the weighted log-scale histogram is also greatly deviated from a linear mapping straight line. In this case, large distortion may occur in the image by second tone mapping and the expression power may be greatly reduced.

Therefore, the processor 160 may modify the second tone mapping curve based on a predetermined boundary line or a clipping line. Specifically, the processor 160 may modify the second tone mapping curve not to exceed the predetermined boundary line.

The predetermined boundary line may mean lines spaced apart from a linear mapping straight line by a certain distance. The predetermined boundary line may include a first boundary line located above the linear mapping straight line and a second boundary line located below the linear mapping straight line, and the first boundary line and the second boundary line may have different distances from the linear mapping straight line.

The order of steps shown in FIG. 9 is merely an example and the present disclosure is not limited thereto. In addition, in one embodiment, some of the steps shown in FIG. 9 may be performed in parallel. In addition, only some of the steps shown in FIG. 9 may be performed.

In one embodiment, the tone mapping apparatus 100 may use the second tone mapping curve for equalizing the weighted log-scale histogram, without performing step S611 of modifying the second tone mapping curve based on the predetermined boundary line.

Figure 10:
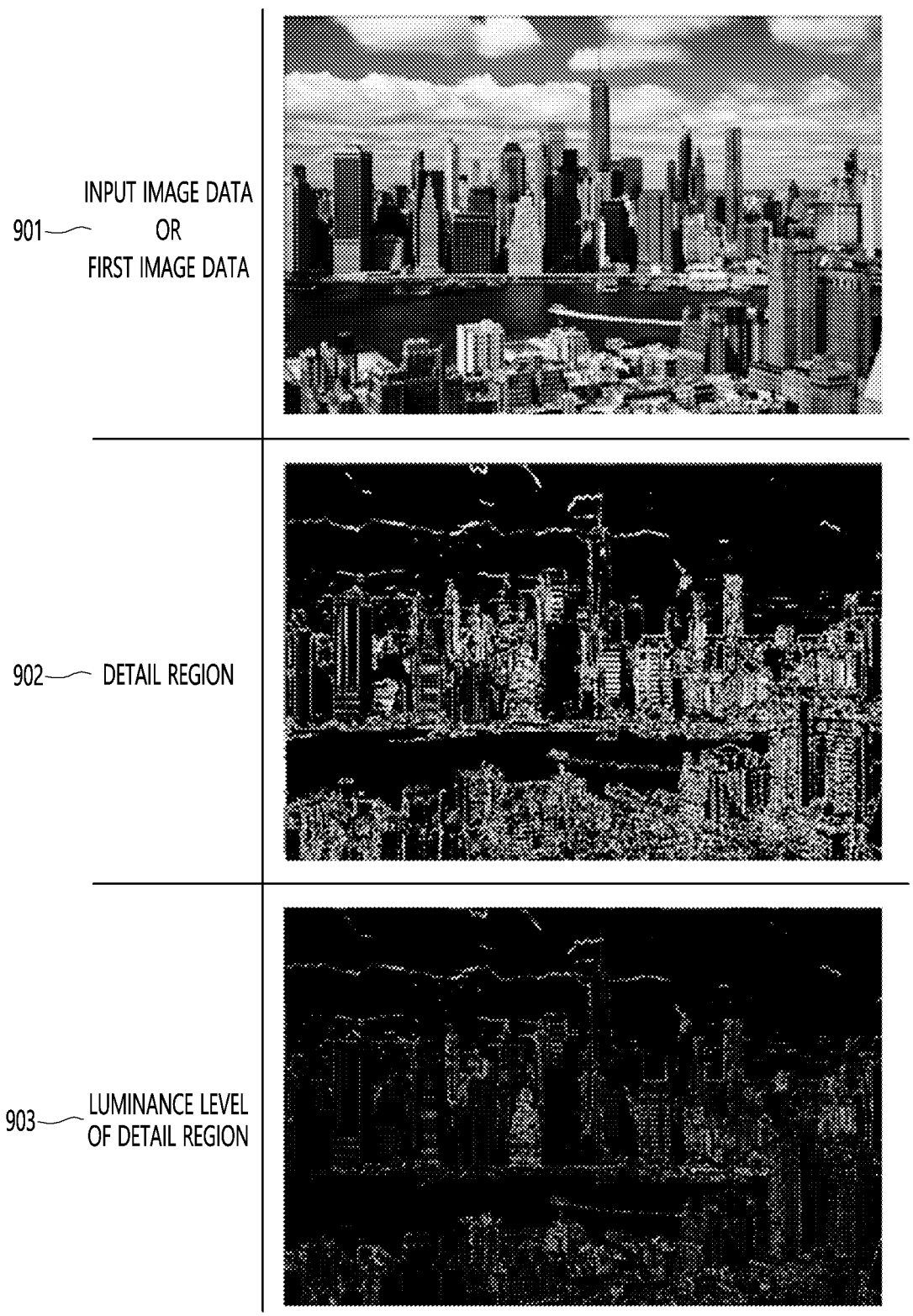
FIG. 10 is a view showing a detail region of image data and the luminance level of the detail region.

FIG. 10 is a view showing a detail region of image data and the luminance level of the detail region.

Referring to FIG. 10, a detail region 902 may be extracted from input image data or first image data 901. The detail region 902 may mean a region having a change in color or luminance exceeding a predetermined reference value compared to neighboring pixels and may mean an edge region.

The tone mapping apparatus 100 may calculate an edge value by calculating a rate of change of the upper, lower left and right pixels which are in contact with each pixel and a rate of change of luminance of adjacent pixels within a certain distance. A pixel having a large edge value is a pixel having a strong edge component and a pixel having a small edge value is a pixel of a region without an edge component. The tone mapping apparatus 100 may determine the detail region 902 by selecting pixels having edge values equal to or greater than the reference value for each pixel.

The tone mapping apparatus 100 may perform tone mapping operation while improving the expression power in the detail region, by using the detail region histogram indicating the distribution of the luminance level 903 in the detail region 902.

Figure 11:
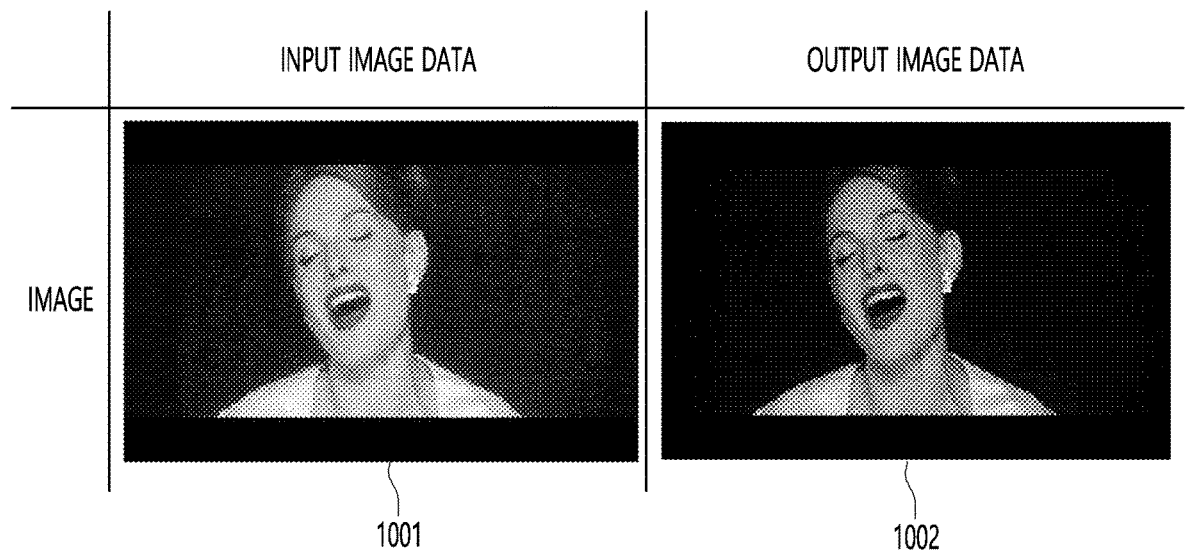
FIGS. 11 and 12 are views showing a tone mapping result of input image data according to an embodiment of the present disclosure.
Figure 12:
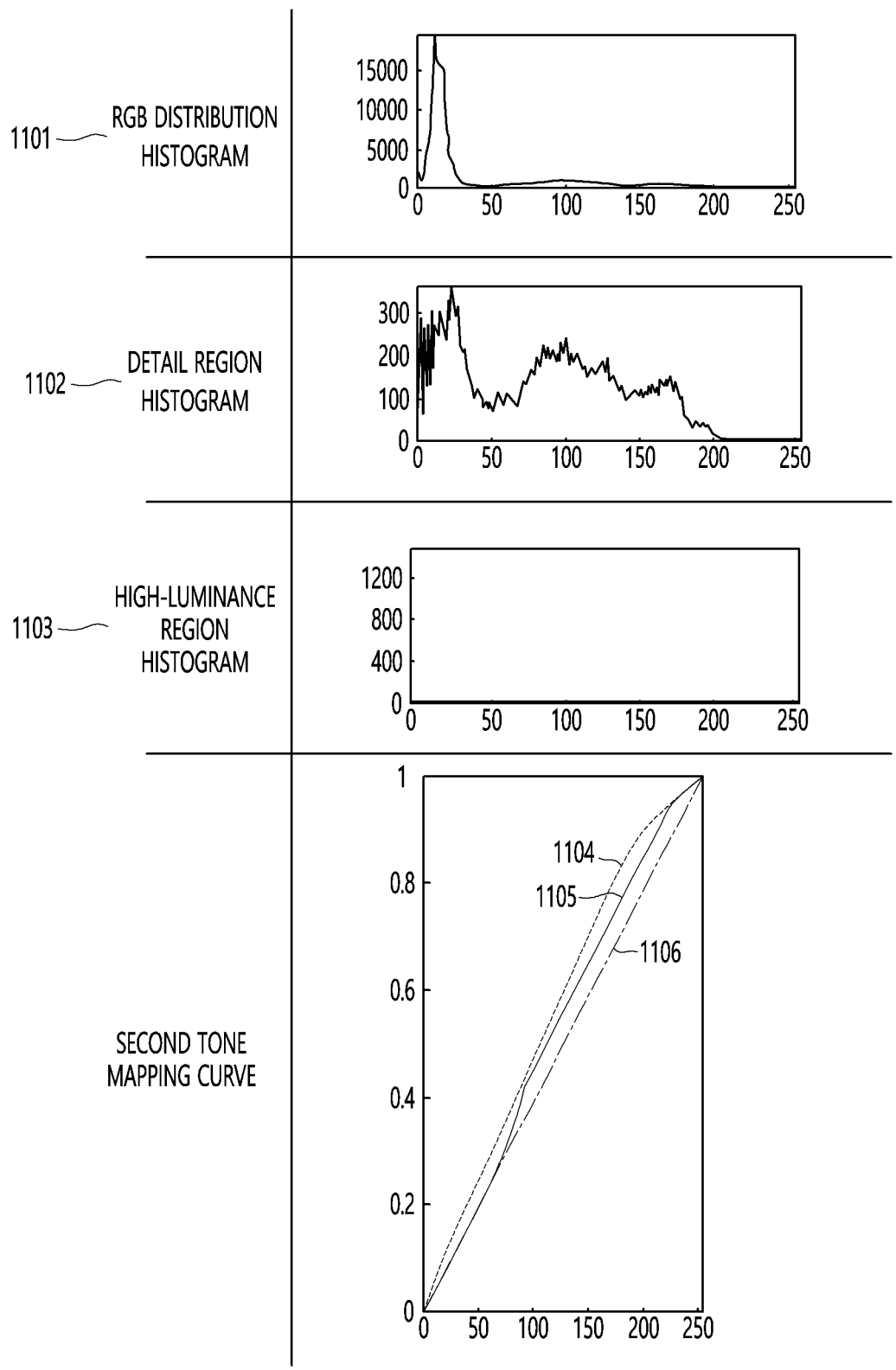

FIGS. 11 and 12 are views showing a tone mapping result of input image data according to an embodiment of the present disclosure.

FIG. 11 shows input image data input to the tone mapping apparatus 100 and output image data 1002 generated therefrom according to tone mapping. Since FIGS. 11 and 12 describe the method of generating the second tone mapping curve, the input image data 1001 may mean first image data.

Referring to FIG. 11, the input image data 1001 has a very large proportion of pixels with low luminance in the entire region. The tone mapping apparatus 100 according to one embodiment of the present disclosure may generate the output image data 1002 from the input image data 1001 through tone mapping. It can be seen that the output image data 1002 has considerable expression power even though the luminance distribution of the input image data 1001 is largely skewed. In particular, the difference may be clearly confirmed as compared with the example shown in FIG. 8.

FIG. 12 shows histograms corresponding to the input image data 1001 shown in FIG. 11.

Referring to FIG. 12, the tone mapping apparatus 100 may generate a weighted log-scale histogram as described above from an RGB distribution histogram 1101, a detail region histogram 1102 and a high-luminance region histogram 1103, generate a tone mapping curve 1104 for equalizing the weighted log-scale histogram, and modify the tone mapping curve 1104 based on a predetermined boundary line to determine a second tone mapping curve 1105. The predetermined boundary may be a straight line separated from a linear mapping straight line 1106 by a predetermined distance.

Figure 13:
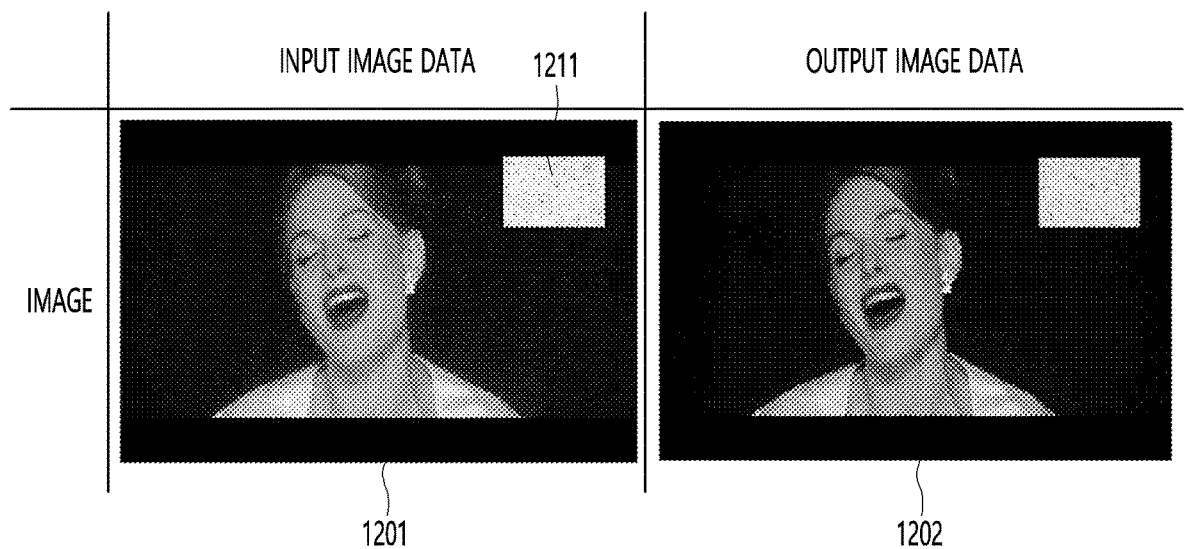
FIGS. 13 and 14 are views showing a tone mapping result of input image data according to an embodiment of the present disclosure.
Figure 14:
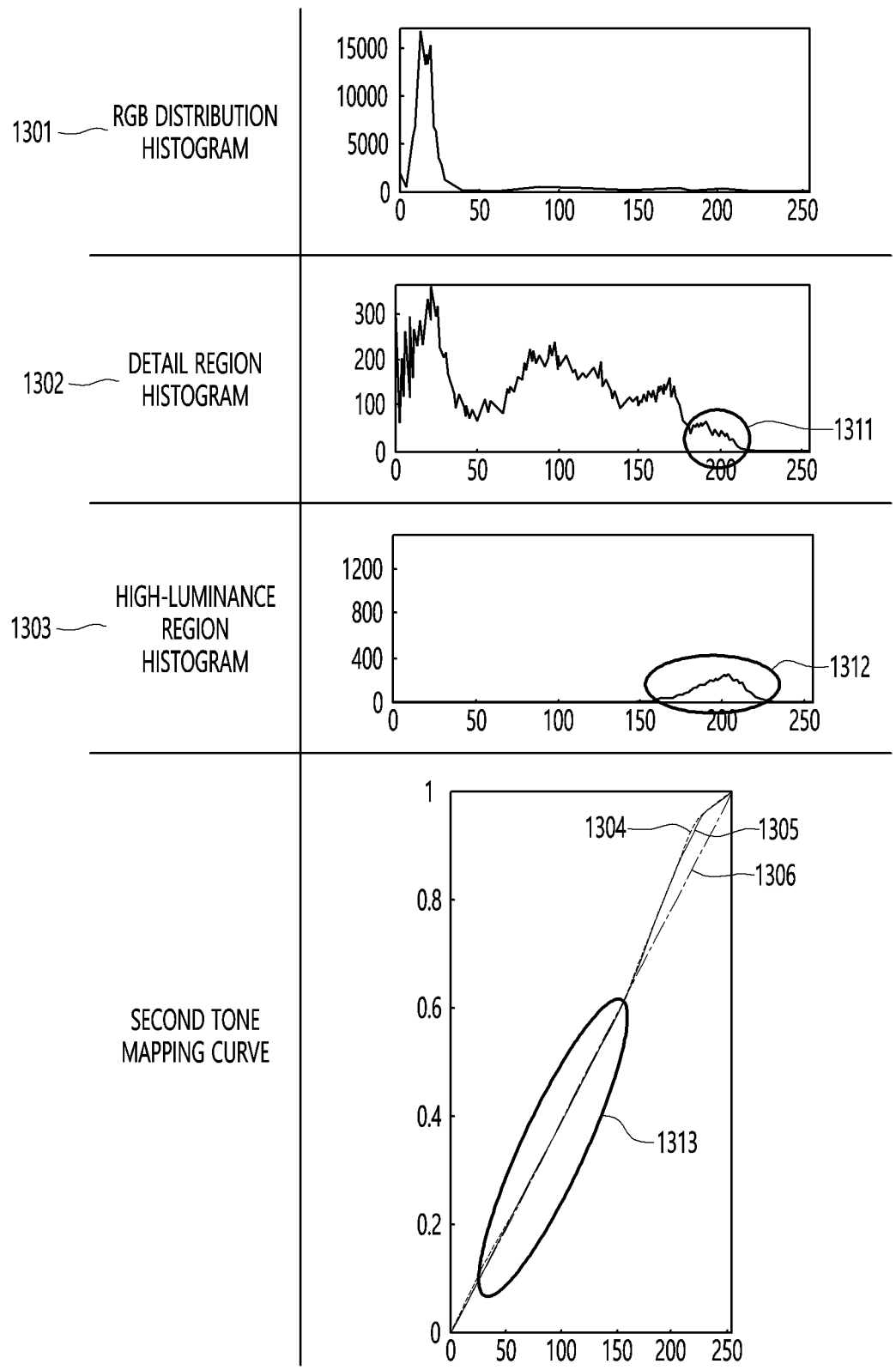

FIGS. 13 and 14 are views showing a tone mapping result of input image data according to an embodiment of the present disclosure.

FIG. 13 shows input image data 1201 input to a tone mapping apparatus 120 and output image data 1202 generated therefrom according to tone mapping. Since FIGS. 13 and 14 describe the method of generating the second tone mapping curve, the input image data 1201 may mean first image data. The input image data 1201 shown in FIG. 12 is image data obtained by adding a high-luminance patch 1211 to a low-luminance region of the input image data 1001 shown in FIG. 10.

Referring to FIG. 13, the input image data 1201 includes the high-luminance patch 1211, but still has a very high proportion of pixels with low luminance in the entire region. If the input image data 1201 is subjected to tone mapping in consideration of only the luminance distribution of the entire region, the expression power of the high-luminance patch 1211 in the output image data 1202 may be lowered. However, the tone mapping apparatus 120 according to one embodiment of the present disclosure may consider the luminance distribution in the high-luminance region and the luminance distribution of the detail region in addition to the luminance distribution of the entire region, thereby maintaining the high-luminance patch 1211 in the output image data 1202 high.

FIG. 14 shows histograms corresponding to the input image data 1201 shown in FIG. 13.

Referring to FIG. 14, the tone mapping apparatus 120 may generate a weighted log-scale histogram as described above from an RGB distribution histogram 1301, a detail region histogram 1302 and a high-luminance region histogram 1303, generate a tone mapping curve 1304 for equalizing the weighted log-scale histogram, and modify the tone mapping curve 1304 based on a predetermined boundary line to determine a second tone mapping curve 1305. The predetermined boundary may be a straight line separated from a linear mapping straight line 1306 by a predetermined distance.

Compared to FIG. 12, the first region 1311 of the detail region histogram 1302 shows the luminance distribution of the detail region increased by the high-luminance patch 1211, and the second region 1312 of the high-luminance region histogram 1303 shows the luminance distribution of the high-luminance region increased by the high-luminance patch 1211. In addition, the third region 1313 of the second tone mapping curve 1305 shows a tone mapping curve adjusted downward in order to preserve the gradation expression power and detail in the high-luminance region.

Figure 15:
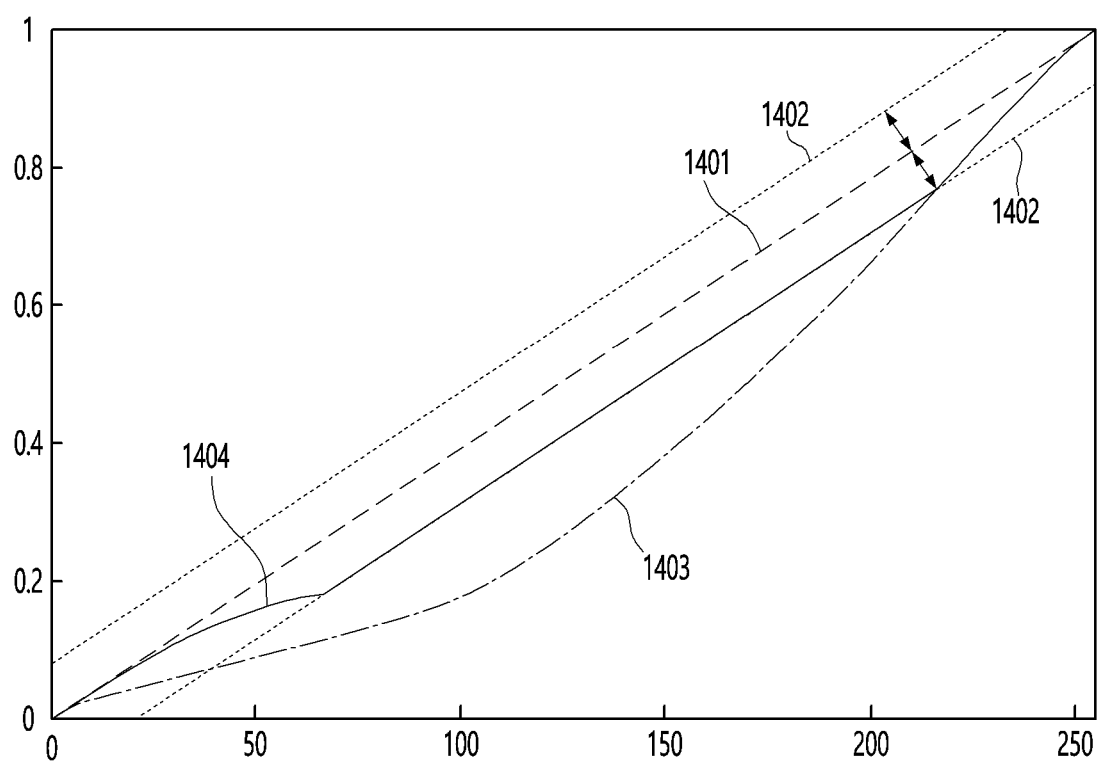
FIG. 15 is a view showing a second tone mapping curve modified based on a boundary line according to an embodiment of the present disclosure.

FIG. 15 is a view showing a second tone mapping curve modified based on a boundary line according to an embodiment of the present disclosure.

Referring to FIG. 15, a boundary line 1402 may be a straight line separated from a linear mapping straight line 1401 by a predetermined distance. The tone mapping apparatus 100 may generate a tone mapping curve 1306 for equalizing the weighted log-scale histogram and modify the generated tone mapping curve 1403 based on the boundary line 1402 to determine a second tone mapping curve 1404. That is, the tone mapping apparatus 100 may modify a mapping relationship so that the tone mapping curve 1403 for equalizing the weighted log-scale histogram is not deviated from the linear mapping straight line 1401 by a predetermined level or more, thereby determining the second tone mapping curve 1404. That is, the second tone mapping curve 1404 may be modified not to be deviated from a region between two boundary lines 1402.

According to various embodiments of the present disclosure, it is possible to provide a tone mapping function for minimizing an image darkness level while improving expression power in a bright region.

According to various embodiments of the present disclosure, it is possible to provide a tone mapping function for minimizing decrease in contrast ratio while improving brightness felt in a dark image.

According to various embodiments of the present disclosure, it is possible to improve a contrast ratio through tone mapping even with respect to an SDR image.

According to an embodiment of the present disclosure, the above-described method may be implemented as a computer-readable code on a medium in which a program is recorded. The computer-readable medium includes all types of recording devices that store data that can be read by a computer system. Examples of computer-readable media include HDD (Hard Disk Drive), SSD (Solid State Disk), SDD (Silicon Disk Drive), ROM, RAM, CD-ROM, magnetic tape, floppy disk, optical data storage device, etc.

What is claimed is:

1. A display apparatus comprising:
   a controller; and
   a display,
   wherein the controller is configured to:
   acquire input image data,
   generate a first tone mapping curve based on a luminance distribution histogram of the acquired input image data,
   generate first image data from the acquired input image data using the generated first tone mapping curve,
   generate a Red, Green, Blue (RGB) distribution histogram, a detail region histogram, and a high-luminance region histogram based on pixel information of the generated first image data,
   generate a second tone mapping curve using the generated RGB distribution histogram, the generated detail region histogram, and the generated high-luminance region histogram, and
   cause the display to display output image data using the generated second tone mapping curve, wherein the output image data is generated from the generated first image data, wherein the RGB distribution histogram is generated based on a luminance value of each pixel in an entire region of the generated first image data, wherein the detail region histogram is generated based on luminance values of pixels each having a detail degree greater than or equal to a predetermined detail reference value in the generated first image data, and wherein the high-luminance region histogram is generated based on luminance values of pixels greater than or equal to a predetermined luminance reference value in the generated first image data.

2. The display apparatus of claim 1, wherein the luminance distribution histogram is generated based on a luminance value of each pixel in an entire region of the acquired input image data, and wherein the first tone mapping curve is generated for equalizing the luminance distribution histogram.

3. The display apparatus of claim 1, wherein the detail degree corresponds to a change in luminance value between adjacent pixels within a certain distance.

4. The display apparatus of claim 1, wherein the controller is further configured to:

convert each of the generated RGB distribution histogram, the generated detail region histogram, and the generated high-luminance region histogram into corresponding log scale histograms, and generate a weighted log-scale histogram by weighting the converted log-scale RGB distribution histogram, the converted log-scale detail region histogram, and the converted log-scale high-luminance region histogram based on a predetermined weight, wherein the second tone mapping curve is generated for equalizing the generated weighted log-scale histogram.

5. The display apparatus of claim 4, wherein the controller is further configured to modify the second tone mapping curve based on a predetermined boundary line.

6. The display apparatus of claim 5, wherein the predetermined boundary line corresponds to a straight line separated from a linear mapping straight line by a predetermined distance, and wherein the controller is further configured to modify the second tone mapping curve to not exceed the predetermined boundary line.

7. The display apparatus of claim 6, wherein the predetermined boundary line comprises a first boundary line located above the linear mapping straight line and a second boundary line located below the linear mapping straight line, and wherein the controller is further configured to modify the second tone mapping curve to not deviate from a region between the first boundary line and the second boundary line.

8. The display apparatus of claim 1, wherein the output image data is generated from the generated first image data using at least one of a central processing unit (CPU) or a graphic processing unit (GPU).

9. A tone mapping method of a display apparatus comprising:

generating a first tone mapping curve based on a luminance distribution histogram of input image data;

generating first image data from the input image data using the generated first tone mapping curve;

generating a Red, Green, Blue (RGB) distribution histogram, a detail region histogram and a high-luminance region histogram based on pixel information of the generated first image data;

generating a second tone mapping curve using the generated RGB distribution histogram, the generated detail region histogram, and the generated high-luminance region histogram; and display output image data using the generated second tone mapping curve, wherein the output image data is generated from the generated first image data, wherein the RGB distribution histogram is generated based on a luminance value of each pixel in an entire region of the generated first image data, wherein the detail region histogram is generated based on luminance values of pixels each having a detail degree greater than or equal to a predetermined detail reference value in the generated first image data, and wherein the high-luminance region histogram is generated based on luminance values of pixels greater than or equal to a predetermined luminance reference value in the generated first image data.

10. The tone mapping method of claim 9, wherein the luminance distribution histogram is generated based on a luminance value of each pixel in an entire region of the input image data, and wherein the first tone mapping curve is generated for equalizing the luminance distribution histogram.

11. The tone mapping method of claim 9, wherein the detail degree corresponds to a change in luminance value between adjacent pixels within a certain distance.

12. The tone mapping method of claim 9, further comprising:

converting each of the generated RGB distribution histogram, the generated detail region histogram, and the generated high-luminance region histogram into corresponding log scale histograms, and generating a weighted log-scale histogram by weighting the converted log-scale RGB distribution histogram, the converted log-scale detail region histogram, and the converted log-scale high-luminance region histogram based on a predetermined weight, wherein the second tone mapping curve is generated for equalizing the generated weighted log-scale histogram.

13. The mapping method of claim 12, further comprising modifying the second tone mapping curve based on a predetermined boundary line.

14. A recording medium having recorded thereon a tone mapping method, the tone mapping method comprising:

generating a first tone mapping curve based on a luminance distribution histogram of input image data;

generating first image data from the input image data using the generated first tone mapping curve;

generating a Red, Green, Blue (RGB) distribution histogram, a detail region histogram and a high-luminance region histogram based on pixel information of the generated first image data;

generating a second tone mapping curve using the generated RGB distribution histogram, the generated detail region histogram, and the generated high-luminance region histogram; and display output image data using the generated second tone mapping curve, wherein the output image data is generated from the generated first image data, wherein the RGB distribution histogram is generated based on a luminance value of each pixel in an entire region of the generated first image data, wherein the detail region histogram is generated based on luminance values of pixels each having a detail degree greater than or equal to a predetermined detail reference value in the generated first image data, and wherein the high-luminance region histogram is generated based on luminance values of pixels greater than or equal to a predetermined luminance reference value in the generated first image data.

15. The recording medium of claim 14, wherein the luminance distribution histogram is generated based on a luminance value of each pixel in an entire region of the input image data, and wherein the first tone mapping curve is generated for equalizing the luminance distribution histogram.

16. The recording medium of claim 14, wherein the detail degree corresponds to a change in luminance value between adjacent pixels within a certain distance.

17. The recording medium of claim 14, wherein the output image data is generated from the generated first image data using at least one of a central processing unit (CPU) or a graphic processing unit (GPU).

* * * * *